Patented Aug. 14, 1945

2,381,873

UNITED STATES PATENT OFFICE 2,381,873

6-AMINO NICOTINAMIDE DERIVATIVES

William Braker, Brooklyn, and Edward Pribyl, Astoria, N. Y., assignors to E. R. Squibb & Sons, New York, N. Y., a corporation of New York No Drawing. Application October 2, 1942, Serial No. 460,552

11 Claims. (Cl. 260—239.6)

This invention relates to, and has for its object the provision of: [A] compounds of the main general formula

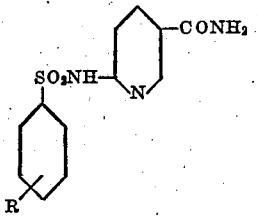

wherein R represents a member of the class consisting of nitro, amino, (lower alkyl)-amino, and acyl-amino; [B] salt-type derivatives of these compounds; and [C] methods of preparing compounds [A] and [B].

The invention comprises especially compounds of the main general formula wherein R is in the para position with respect to the $SO_2$, and salt-type derivatives thereof. The amino compounds of this type—notably 6-sulfanilamido-nicotinamide (or 5-carbamyl-sulfapyridine) and the salt-type derivatives thereof—are valuable chemotherapeutic agents.

The compounds of this invention may be prepared by condensing a nitro-phenyl-sulfonyl halide with 2-amino-5-cyano-pyridine, preferably in a pyridine-type reaction medium (e. g., pyridine, quinoline, or dimethylaniline), subjecting the resulting 2-(nitro-phenyl-sulfonamido)-5-cyano-pyridine to a partial hydrolysis to obtain the corresponding carboxylic acid amide, and—if the amino compound is desired—reducing the thus-obtained 6-(nitro-phenyl-sulfonamido)-nicotinamide to the corresponding amino compound. Alternatively, the amino compounds may be prepared by condensing an amino-phenyl-sulfonyl halide (the amino group of which carries a lower-alkyl or acyl substituent) with 2-amino-5-cyano-pyridine, preferably in a pyridine-type reaction medium, subjecting the condensation product to a partial hydrolysis to obtain the corresponding carboxylic acid amide, and—if a free amino compound is desired—hydrolyzing the thus-obtainable 6-(acylamino-phenyl-sulfonamido)-nicotinamide.

The compounds of the main general formula form salts with bases (including organic bases), particularly alkalies—i. e., the alkali-metal (including ammonium) and alkaline-earth-metal bases; and those compounds of the main general formula wherein R is the amino group form water-soluble acid-addition salts with hydrochloric, sulfuric, nitric, and other acids commonly used to solubilize amine bases.

The salt-type derivatives [B] also comprise (besides the aforementioned simple salts) compounds wherein R is the amino group, a hydrogen of which is replaced by a salified radical of the following type, inter alia:

—CO—$(CH_2)_n$—COO—(alkali metal)

wherein $n$ is an integer from 2 to 5

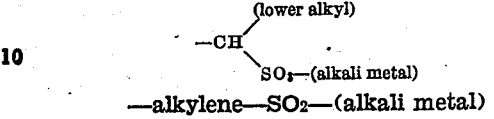

—alkylene—$SO_2$—(alkali metal)

The following examples are illustrative of the invention.

EXAMPLE 1

*Preparation of 6-(p-nitro-phenyl-sulfonamido)-nicotinamide*

(a) 20 g. 2-amino-5-cyano-pyridine is dissolved in 200 cc. pyridine, 40 g. p-nitro-benzene-sulfonyl chloride is added, and the solution is heated at 80° C. for 2.5 hours and then poured into 10% hydrochloric acid. The resulting precipitate, 2-(p-nitro-phenyl-sulfonamido)-5-cyano-pyridine, is collected by suction filtration, washed with water, and dried; and when crystallized from acetone, it is obtained as a yellow crystalline material melting at 217–218° C. This product may be further purified by solution in dilute sodium hydroxide and precipitation with acetic acid, being thereby obtained as a yellow powder melting at 224–225° C.

(b) 16 g. 2-(p-nitro-phenyl-sulfonamido)-5-cyano-pyridine is dissolved in 160 cc. water containing 2.7 g. sodium hydroxide, 28 cc. 30% hydrogen peroxide solution is added at 50° C., and the resulting solution is heated at 70° C. for 45 minutes. The reaction mixture is then acidified with acetic acid; and the resulting precipitate, 6-(p-nitro-phenyl-sulfonamido)-nicotinamide, is collected by suction filtration, washed with water, and dried. The product melts at 180° C.; and when crystallized from alcohol, it is obtained as a yellow crystalline solid melting at 184–185° C.

EXAMPLE 2

*Preparation of 6-sulfanilamido-nicotinamide*

14 g. 6-(p-nitro-phenyl-sulfonamido)-nicotinamide is suspended in 440 cc. 95% alcohol, 36 g. iron powder is added, followed by 2.8 cc. 18% hydrochloric acid, and the mixture is stirred and refluxed for 8 hours. The reaction mixture is then filtered, and the filter cake extracted with dilute ammonium hydroxide solution; and the extracts are combined, and acidified with acetic acid. The resulting precipitate, 6-sulfanilamidonicotinamide, is collected by suction filtration, and washed with water; and when purified by crystallization from water, it is obtained as a light-buff-colored crystalline material melting at 202.5–203° C.

EXAMPLE 3

*Preparation of the sodium salt of 6-sulfanilamido-nicotinamide*

20 g. 6-sulfanilamido-nicotinamide is dissolved in 100 cc. water containing 2.74 g. sodium hydroxide, and the solution is evaporated to dryness in vacuo. The residue, the sodium salt of 6-sulfanilamido-nicotinamide, is a white powder which readily dissolves in water.

EXAMPLE 4

*Preparation of the hydrochloride of 6-sulfanilamido-nicotinamide*

6-sulfanilamido-nicotinamide is dissolved in absolute alcohol, an equivalent quantity of dry hydrogen chloride is added, and the hydrochloride of 6-sulfanilamido-nicotinamide is precipitated by adding ether (or by evaporating the alcoholic solution to dryness). An aqueous solution of the salt may be prepared without isolating the salt, by adding the 6-sulfanilamido-nicotinamide to a dilute aqueous solution of hydrochloric acid.

EXAMPLE 5

*Preparation of the sodium salt of 6-[p-(α-sulfoethylamino)-phenyl-sulfonamido]-nicotinamide*

10.5 g. 6-sulfanilamido-nicotinamide, 6.3 g. sodium acetaldehyde bisulfite (85%), and 25 cc. water are mixed together, and the mixture is gradually heated to 90° C. over a period of ¾ hour, while stirring. The resultant practically complete solution is filtered, and the filtrate is diluted with 300 cc. absolute alcohol and cooled to 10° C.; and the precipitated salt is collected by suction filtration, and is purified by dissolving in 85% alcohol, filtering, and evaporating the filtrate to dryness. (An additional quantity of the desired salt may be obtained from the filtrate of the precipitated crude salt by evaporating to dryness in vacuo.) The purified salt is a pale-yellow powder, which readily dissolves in water, yielding solutions having a pH of 5.2 (1%) and 5.1 (5%).

Manifestly, other compounds of the main general formula and other salt-type derivatives may be obtained by using the appropriate equivalent reactants in the procedure of the foregoing examples; and a variety of N4-derivatives of 6-sulfanilamido-nicotinamide—and corresponding derivatives of the other 6-(amino-phenyl-sulfonamido)-nicotinamides—may be obtained by procedures well known in the sulfanilamide-type compound art.

The following are further examples of compounds embraced by this invention and of additional reactants.

COMPOUNDS

*Example 6.*—The calcium salt of 6-sulfanilamido-nicotinamide

*Example 7.*—N4-succinyl-6-sulfanilamido-nicotinamide

*Example 8.*—The sodium-formaldehyde-sulfoxylate derivative of 6-sulfanilamido-nicotinamide

*Example 9.*—The sodium salt of N4-succinyl-6-sulfanilamido-nicotinamide

*Example 10.*—6-(p-acetylamino-phenyl-sulfonamido)-nicotinamide

REACTANTS o-Nitro-benzene-sulfonyl chloride
m-Nitro-benzene-sulfonyl chloride
m-Acetamino-benzene-sulfonyl chloride
p-Methylamino-benzene-sulfonyl chloride
p-Diethylamino-benzene-sulfonyl chloride The invention may be variously otherwise embodied within the scope of the appended claims.

We claim:

1. A compound of the group consisting of: compounds of the general formula

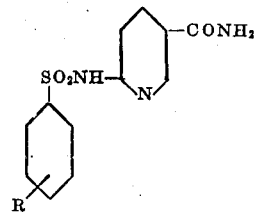

wherein R represents a member of the class consisting of nitro, amino, (lower alkyl)-amino, and acyl-amino; and salts of these compounds.

2. A compound of the general formula

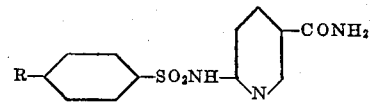

wherein R represents a member of the class consisting of nitro, amino, (lower alkyl)-amino, and acyl-amino.

3. A 3-carbamyl-6-(amino-phenyl-sulfonamido)-pyridine.

4. 3-carbamyl-6-sulfanilamido-pyridine.

5. An alkali salt of a 3-carbamyl-6-(amino-phenyl-sulfonamido)-pyridine.

6. An acid-addition salt of a 3-carbamyl-6-(amino-phenyl-sulfonamido)-pyridine.

7. The sodium salt of 3-carbamyl-6-sulfanilamido-pyridine.

8. The method of preparing a compound of the general formula

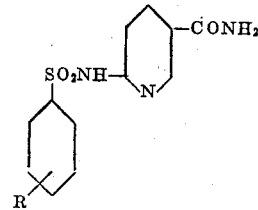

wherein R represents a member of the class consisting of nitro, amino, (lower alkyl)-amino, and acyl-amino, which comprises condensing a member of the group consisting of nitro-phenyl-sulfonyl halides, acylamino-phenyl-sulfonyl halides, and [(lower alkyl)-amino]-phenyl-sulfonyl halides, with 2-amino-5-cyano-pyridine, and subjecting the condensation product to a partial hydrolysis to obtain the corresponding carbamide.

9. The method of preparing a compound of the general formula

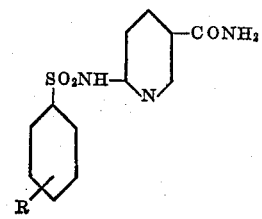

wherein R represents a member of the class consisting of nitro, amino, (lower alkyl)-amino, and acyl-amino, which comprises condensing a member of the group consisting of nitro-phenyl-sulfonyl halides, acylamino-phenyl-sulfonyl halides, and [(lower alkyl)-amino]-phenyl-sulfonyl halides, with 2-amino-5-cyano-pyridine in a pyridine-type reaction medium, and subjecting the condensation product to a partial hydrolysis to obtain the corresponding carbamide.

10. The method which comprises condensing a nitro-phenyl-sulfonyl halide with 2-amino-5-cyano-pyridine, and subjecting the resulting 2-(nitro-phenyl-sulfonamido)-5-cyano-pyridine to a partial hydrolysis to obtain the corresponding carbamide.

11. The method of preparing 6-sulfanilamido-nicotinamide which comprises condensing p-nitro-phenyl-sulfonyl halide with 2-amino-5-cyano-pyridine, subjecting the resulting 2-(p-nitrophenyl-sulfonamido)-5-cyano-pyridine to a partial hydrolysis to obtain the corresponding carbamide, and reducing the resulting 6-(p-nitrophenyl-sulfonamido)-nicotinamide to the corresponding amino compound.

WILLIAM BRAKER.
EDWARD PRIBYL.